Patented Nov. 21, 1939

2,181,102

UNITED STATES PATENT OFFICE

2,181,102

STABILIZATION OF POLYMERIZABLE VINYL COMPOUNDS

Sylvia M. Stoesser and Wesley C. Stoesser, Midland, Mich., assignors to The Dow Chemical Company, Midland, Mich., a corporation of Michigan No Drawing. Application June 4, 1937,
Serial No. 146,520

5 Claims. (Cl. 23—250)

This invention concerns a method for stabilizing vinyl compounds, particularly styrene and its homologues and analogues, and the resultant stabilized compositions together with products prepared from the latter.

In the manufacture of styrene and other polymerizable vinyl compounds, difficulty is frequently encountered in purifying and marketing the products due to their tendency to polymerize when heated to a distilling temperature or when permitted to stand at room temperature during storage and shipment. Such polymerization during storage or shipment is disadvantageous not only because the material may solidify in containers and thereafter be difficult to handle, but also because the properties, e. g., toughness, pliability, solubility in solvents, etc., of the polymer are usually dependent on the exact conditions under which the polymerization is carried out and such uncontrolled polymerization during storage or shipment may interfere with or prevent obtainment of a polymer satisfactory for the purpose to which it is to be applied. Accordingly, readily polymerizable vinyl compounds, such as styrene, are usually polymerized under controlled conditions by the manufacturer and marketed in the form of their polymers, although the ultimate consumer would frequently prefer to carry out the polymerization under the conditions which would yield a product best suited to his particular purpose.

An object of this invention is to provide a method and suitable agents for inhibiting the polymerization of styrene and other vinyl compounds and also to provide stabilized compositions from which the stabilizing agent may, if desired, be removed without difficulty to recover the vinyl compound in readily polymerizable condition. Other objects will be apparent from the following description of the invention.

We have discovered that the polymerization of styrene, or other polymerizable vinyl compound, may be effectively inhibited by dissolving therein a catechol derivative having the general formula:

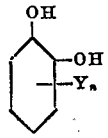

wherein Y is a hydrocarbon radical and $n$ is an integer from 1 to 4. Among the various catechol derivatives which may be employed for such purpose are methyl-catechol, ethyl-catechol, iso-propyl-catechol, di-isopropyl-catechol, secondary-butyl-catechol, tertiary-butyl-catechol, di-(tertiary-butyl)-catechol, tertiary-amyl-catechol, octyl-catechol, phenyl-catechol, benzyl-catechol, cyclohexyl-catechol, etc.

Of the catechol derivatives just mentioned, we have further found that those containing a hydrocarbon substituent in the 3-position of the nucleus, e. g., 3-methyl-catechol, 3.5-diethyl-catechol, 3-tertiary-butyl-catechol, 3.5-di-(tertiary-butyl)-catechol, 3-phenyl-catechol, etc., are most effective as agents for inhibiting the polymerization of vinyl compounds. Such preferred agents have the general formula;

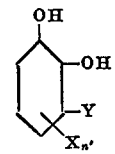

wherein Y is a hydrocarbon radical, X is hydrogen or a hydrocarbon radical, and $n'$ is an integer from 1 to 3.

Examples of vinyl compounds which may be stabilized against polymerization by treatment with one of the foregoing catechol derivatives are vinyl chloride, vinyl acetate, styrene, para-chloro-styrene, para-methyl-styrene, ethyl-vinyl-benzene, divinyl-benzene, vinyl-naphthalene, etc. Apparently any vinyl compound capable of being polymerized may be rendered relatively stable against polymerization by treatment with a nuclear hydrocarbon-substituted catechol.

A polymerizable vinyl compound may be stabilized to at least some extent by treatment with any proportion of one of the foregoing catechol derivatives, but the degree of stabilization is of course greater as the proportion of the catechol derivative is increased. For example, from 0.1 to 5 per cent by weight of the catechol derivative dissolved in a vinyl compound is usually sufficient to stabilize the latter for ordinary storage purposes, although the minimum proportion required is dependent upon the particular compounds employed, the period over which the material is to be stored, the temperatures to be encountered during storage, etc., and may vary. The catechol derivative may, of course, be employed in as large a proportion as desired.

After storage or shipment of the stabilized composition, the vinyl compound may be separated by distillation or otherwise from the catechol derivative and be recovered in pure and readily polymerizable condition. During such distillation, the catechol derivative inhibits polymerization of the vinyl compound, thereby permitting the latter to be recovered in good yield without the usual loss through polymerization.

It is entirely practicable to treat crude styrene or other vinyl compound, as obtained in its manufacture by usual methods, with one of the stabilizing agents hereinbefore mentioned, store or ship the crude material in stabilized condition, and when desired to distill the mixture to obtain the vinyl compound in pure polymerizable form. In such practice, the catechol derivative stabilizes the vinyl compound not only during storage and shipment, but also during purification of the compound by distillation.

The following table describes the condition of styrene and certain solutions of catechol derivatives in styrene after being heated at a temperature of 125° C. for the periods of time stated. Each such solution contained 1 per cent by weight of the catechol derivative mentioned in the table and 99 per cent of styrene. In the table, the symbols $a-f$, used to indicate the condition of the material after the stated hours of heating, carry the following meanings:

(a) No thickening or other visible change occurred;

(b) The material is slightly but visibly more viscous than freshly distilled styrene;

(c) The material is a viscous but free-flowing liquid;

(d) The material is a very viscous liquid;

(e) The material is a very soft solid resin;

(f) The material is a tough solid resin.

Table

| Experiment number | Catechol derivative | Condition after heating at 125° C. for— | | | | | | | | | | | |
|---|---|---|---|---|---|---|---|---|---|---|---|---|
| | | 1.5 hrs. | 3 hrs. | 5 hrs. | 8 hrs. | 10 hrs. | 14 hrs. | 17 hrs. | 21 hrs. | 25 hrs. | 30 hrs. | 34 hrs. | 42 hrs. |
| 1 | None | c | d | d | e | f | | | | | | | |
| 2 | 4-methyl-catechol | a | a | a | a | a | a | a | a | b | b | b | |
| 3 | 4-tertiary-butyl catechol | a | a | a | a | a | a | b | b | b | b | b | c |
| 4 | 4-tertiary-amyl catechol | a | a | a | a | a | b | b | b | b | c | c | d |
| 5 | 4-octyl catechol | a | a | b | b | b | b | b | b | c | c | c | d |
| 6 | 4-phenyl catechol | a | a | a | a | a | b | c | c | c | d | d | d |
| 7 | Cyclohexyl-catechol | a | a | a | b | b | b | b | b | c | c | c | d |
| 8 | 4-benzyl-catechol | c | a | b | b | b | b | c | c | c | d | d | d |
| 9 | 3-methyl-catechol | a | a | a | a | a | a | a | a | a | a | a | a |
| 10 | 3,5-di-(tertiary butyl)-catechol | a | a | a | a | a | a | a | a | a | a | a | a |
| 11 | 3-phenyl-catechol | a | a | a | a | a | a | a | a | a | a | a | b |

Other vinyl compounds such as vinyl chloride, vinyl acetate, divinylbenzene, may similarly be stabilized against polymerization by treatment with one of the hereinbefore mentioned catechol derivatives.

In the following claims the term "styrene compound" is employed generically to refer to styrene and its homologues and analogues, e. g., alpha - methyl - styrene, para - methyl - styrene, para - chloro - styrene, ethyl-vinyl-benzene, divinyl-benzene, vinyl naphthalene, etc.

Other modes of applying the principle of the invention may be employed instead of those explained, change being made as regards the method or compounds herein disclosed, provided the steps or compounds stated by any of the following claims, or the equivalent of such stated steps or compounds be employed.

We therefore particularly point out and distinctly claim as our invention:

1. A liquid composition comprising a styrene compound and a proportion of a catechol derivative having the general formula

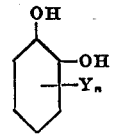

wherein Y represents a hydrocarbon radical and $n$ is an integer from 1 to 4 sufficient to inhibit polymerization of the styrene compound.

2. A liquid composition comprising a styrene compound and a proportion of a catechol derivative having the general formula

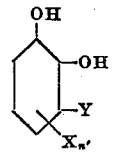

wherein Y represents a hydrocarbon radical, X represents hydrogen or a hydrocarbon radical, and $n'$ is an integer from 1 to 3 sufficient to inhibit polymerization of the styrene compound.

3. A liquid composition comprising styrene and a proportion of 3-methyl-catechol sufficient to inhibit polymerization of the styrene.

4. A liquid composition comprising styrene and a proportion of 3,5-di-(tertiary-butyl)-catechol sufficient to inhibit polymerization of the styrene.

5. A liquid composition comprising styrene and a proportion of 3-phenyl-catechol sufficient to inhibit polymerization of the styrene.

SYLVIA M. STOESSER.
WESLEY C. STOESSER.